INVENTORS
MORRIS SCHWARTZ
WERNER K. BENDER

BY Hane and Nydick

Attorneys

Sept. 26, 1967 M. SCHWARTZ ETAL 3,344,238

MAGNETICALLY CONDUCTIVE INK RECORDING SYSTEM

Filed Jan. 3, 1963 2 Sheets-Sheet 2

INVENTORS
MORRIS SCHWARTZ
WERNER K. BENDER
BY Kane and Nydick
Attorneys 3,344,238

MAGNETICALLY CONDUCTIVE INK RECORDING SYSTEM

Morris Schwartz and Werner K. Bender, Plainville, Conn., assignors to The Kalart Company, Inc., Plainville, Conn., a corporation of New York Filed Jan. 3, 1963, Ser. No. 249,297
12 Claims. (Cl. 179—100.2)

The present invention relates to a method of magnetically producing and reproducing sound, and to a sound message pattern produced by said method on a carrier. The invention also relates to a method of and a device for reproducing a message from said sound pattern as an audible sound message.

There are known optical sound recordings and magnetic sound recordings. For optical recording two patterns are available and now in general use, namely the visible variable density pattern and the visible variable area pattern. Magnetic recordings can be made heretofore exclusively in a pattern but invisible to the eye, corresponding in principle to optical variable density recording, except for "yes" and "no" signals for which the variable area pattern may be used. However, as is evident, such binary signals do not have a frequency range usable for the reproduction of complex aural messages, for instance speech or music.

Magnetic recording as heretofore known is made by applying electronically induced modulated magnetic pulses to a layer of magnetizable oxide by means of a magnetic sound recording head. The layer may be formed by coating a suitable carrier such as a sheet or tape made of paper or plastics. The produced sound pattern is invisible. Each sound pattern must be individually recorded which is a rather slow and laborious procedure.

It is a broad object of the present invention to provide a novel and improved method of producing a magnetic sound pattern which is visible to the eye and constitutes in effect a latent audible message. Such method affords the advantage that any desired number of copies of magnetic message patterns can be rapidly and inexpensively produced by conventional ink printing techniques.

A more specific object of the invention is to provide a novel and improved method of producing a sound pattern, which method resides in printing by means of magnetically conductive ink a visible variable area pattern directly upon a suitable substrate such as paper.

Another more specific object of the invention is to provide a novel and improved method of producing a magnetic sound pattern by which method a visible and permanent variable area pattern is produced directly on a substrate, that is, a sound pattern which cannot in any way be altered by subsequent action of a magnetic field. Accordingly, the printed pattern will permanently, correctly and visibly reflect the originally recorded sequence of signals whereas an invisible magnetic sound track conventionally recorded by magnetizing a layer of magnetizable oxide by passing a magnetic head along the track, can be intentionally or accidentally erased or distorted in full or in part.

It is also a broad object of the invention to provide a novel and improved sound track formed by a visible variable area pattern printed with magnetically conductive ink directly and permanently upon a suitable substrate.

Another object of the invention is to provide a novel and improved method of audibly playing back a variable area sound pattern visibly printed directly on a suitable substrate such as paper with magnetically conductive ink, by premagnetizing the sound pattern prior to scanning the same with a play back head. Such presensitizing or premagnetizing of the pattern affords the advantage that the pattern is brought up to full signal level reproduction for each audible play back.

Still another object of the invention is to provide a novel and improved device for playing back a visible variable area sound pattern printed directly on a suitable substrate with magnetically conductive ink, with which device the pattern is always raised to full level of audible reproduction prior to scanning the same by arranging directly ahead of the scanning head a presensitizing head in the form of a permanent magnet or electro-magnet energized with D-C for sensitizing the visible ink printed pattern. The visible ink printed pattern can also be sensitized by means of an electro-magnet energized with A-C and applying to such electro-magnet a single frequency above the audible range for instance 15,000 c./sec.

Other and further objects, features and advantages of the invention will be pointed out hereinafter and set forth in the appended claims constituting part of the application.

In the accompanying drawing several preferred embodiments of the invention are shown by way of illustration and not by way of limitation.

There are now known various types of optical variable area patterns as used for sound motion picture films. For instance:

Unilateral
Dulateral
Bilateral
Duplex
Multiple

All the patterns as now known and similar patterns may be developed hereinafter are basically suitable for printing visible variable area sound patterns with magnetically conductive ink, but it has been found that among the patterns as now known, the bilateral pattern is preferable in that it assures the best contact between the magnetic scanning or play back head and the visible ink printed variable area pattern.

In principle, printing of the pattern may be effected by any method adapted from the printing art, or analogous to the methods of the printing art, such as letterpress printing, offset printing, silk screen printing, etc. The printing matrix or plate used for final printing of the pattern may, for example, be engravings on metal or lithographic stones, or it may be prepared by any of the available photomechanical processes, or the printing matrix may be a photographic plate. However, for the purpose of the invention the demands on the fidelity of the reproduction of the original sound recording by printing a variable area pattern on a substrate are much more exacting than is generally the case in the printing art. Such demand of high fidelity entails that careful consideration be given to the relationship between the frequency response of the pattern during play back and the resolving power afforded by the printing process which is used.

Since there is a definite relationship between the resolving power of the visible printed pattern and the frequency response from that pattern produced with magnetically sensitized ink, the invention encompasses the use of a printing process of high resolution which produces up to 500 lines per mm., which would yield a frequency response of up to 31,250 c./sec. at 5 inch/sec. scanning speed and using a magnetic play back head having a gap of two microns width. A printing process of such high resolution is now known in the art.

Since it is necessary to reproduce 80 lines per mm. in order to obtain a frequency response of 5000 c./sec. at 5 inch/sec. scanning speed, a process capable of producing 500 lines per mm. is more than adequate.

The preparation of the printing matrix will now be described. Since as previously stated, there is now no process known for producing a visible magnetic variable area sound pattern, an optical variable area recording on a suitable carrier such as photographic is first made. The optically recorded pattern is then used as a master pattern for preparing the printing matrix.

Figure 1:
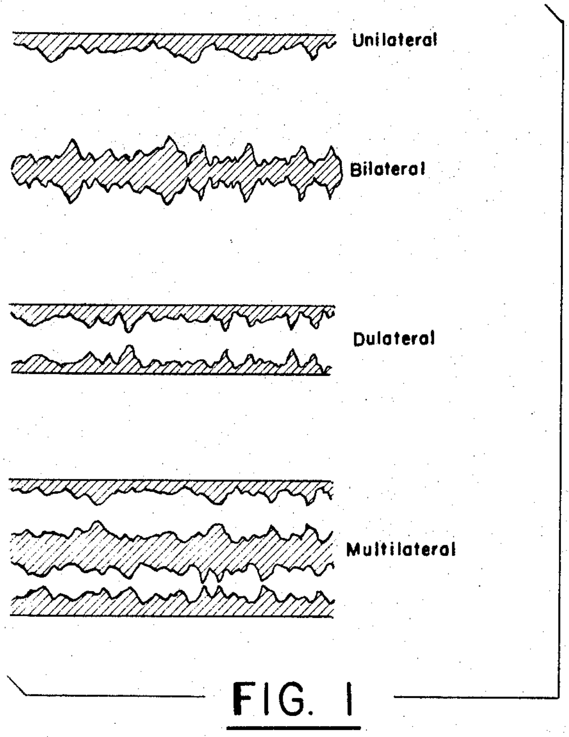
FIG. 1 shows exemplifications of variable area sound patterns.
Figure 2:
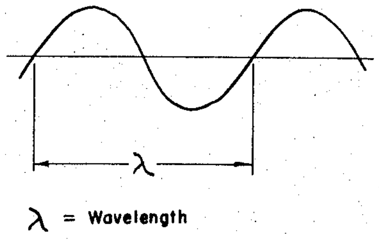
FIG. 2 is a graph of a frequency wave.

Turning now to the problem of maintaining a satisfactory relation between the frequency response of the printed pattern during play back and the resolution capability of the printing process employed, let it be assumed that the scanning speed is equal to a recording speed of 5 inch/sec. and that it is desired to have a frequency band between 80 c./s. and 5,000 c./s. The length $\lambda$ of the sine wave shown in FIG. 2 is then $\lambda = .001'' = 25$ microns. In order to obtain an accurate reproduction of the shape of such sine wave the resolving power of the printing process should be several times higher, if possible 10 times higher, that is 2.5 microns.

Optically, a resolving power down to about .0001″ or 2.5 microns is obtainable without difficulty according to the present state of the art, that is a resolving power 10 times better than the wave length of 25 microns.

Among the various known printing techniques, offset printing has excellent resolving power. A resolution of 500 lines per mm. is readily available, and there are known offset printing processes capable of up to 5 times higher resolution.

The aforegiven data of printing processes readily available in the market show that the resolving power of these processes are fully adequate to prepare a printing matrix of satisfactory accuracy as far as resolution is concerned. However, certain other limitations inherent in printing processes should be taken into consideration.

Figure 3:
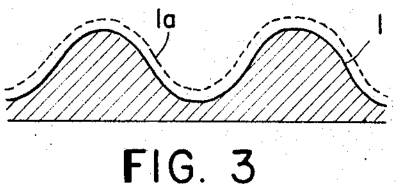
FIG. 3 is a diagrammatic view of low frequency signals visibly printed with magnetically conductive ink.
Figure 4:
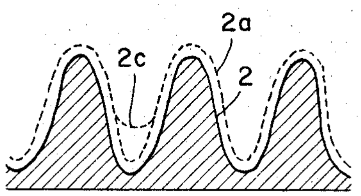
FIG. 4 is a diagrammatic view of high frequency signals visibly printed with magnetically conductive ink.

A visible variable area pattern is basically composed of sine waves. Low frequency waves in such pattern are generally rather shallow while high frequency waves are rather steep, as is indicated in FIG. 3 by low frequency waves 1 and in FIG. 4 by high frequency waves 2.

When such a pattern is printed with magnetically conductive ink, the pressure exerted by the printing plate during the printing process tends to cause the ink to creep across the intended outline of the pattern on its carrier. This creeping of the ink results with the shallow low frequency waves merely in a shift or displacement of the entire pattern as it is indicated in FIG. 3 by a dotted line 1*a*. Hence the wave shapes as such and thus the sound reproduced therefrom remain unchanged. However, with the steep high frequency waves, the ink tends to creep, not only parallel to the outline of the waves as is indicated at 2*a* in FIG. 4, but also into the narrow valleys between two adjacent waves, as is indicated at 2*c*. Such further creeping distorts the wave form and hence the reproduction of sound therefrom. It can be compensated for by predistorting the wave shape during the optical recording of the pattern preceding the ink printing and constituting one of the steps used for preparing the printing plate. There are known several methods of distorting the wave pattern during optical recording. A suitable method is by using an amplifier having non-linear transfer characteristics and shifting the point of operation of such amplifier in accordance with the frequency involved.

Figure 5:
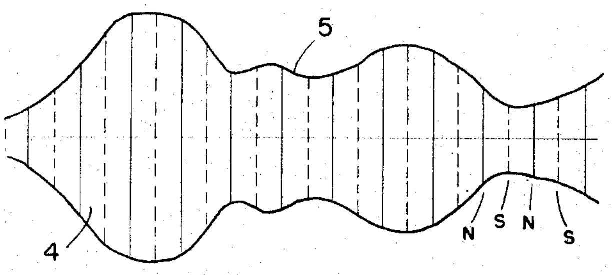
FIG. 5 is a diagrammatic view of visibly printed sound waves energized by a magnetic field.

FIG. 5 shows diagrammatically a visible sound pattern printed with magnetically conductive ink. The envelope 4 of the pattern defines the printed audio message and the material 5 within the envelope is a layer of hardened, magnetically conductive ink, or in other words, a layer of magnetizable material, such as iron oxide. As will be more fully explained hereinafter, the magnetizable material is energized or sensitized by subjecting it to a magnetic field generated by high frequency alternating current. As a result, the elementary magnet particles in the layer are oriented. The north poles in the layer are indicated by full lines and the south poles by dotted lines. When such energized layer is scanned with a magnetic sound head, the modulated high frequency is picked up by the head and after demodulation, sound in accordance with the outline of the envelope is audibly reproduced.

It is generally convenient to produce the optical variable area pattern at the width and length that is desired for printing the magnetic variable pattern. A width of ¼ inch has been found to be particularly suitable. However, if it is desired to change the length and/or width of the optical pattern as recorded this can be easily effected. Various anamorphic and other optical systems are available for the purpose and well known in the art.

Let it now be assumed that a variable area master sound pattern has been prepared on a film negative in accordance with the previous discussion. The length of the pattern track may be and often is in excess of the width of the printing plate or of the carrier upon which the pattern is ultimately to be printed. In such event the pattern track on the film may be sectionalized by means suitable for the purpose and fully described, for instance in U.S. Patent 3,051,042.

As previously pointed out, the printing plates are prepared by any of the methods of and from any of the materials known and used in the printing art. In this connection it should be pointed out that the term "printing plate" is intended to encompass printing rollers and other matrices from which prints may be made. A particularly suitable method of preparing the printing plate is coating of a metal plate with a photo resist, developing the exposed coating and etching away the unwanted parts of the coating.

Printing of the sound pattern upon the carrier is effected in a conventional manner, except that a magnetically conductive ink is used instead of printer's ink. The properties of the ink and also of the carrier should be such that a good and permanent bondage between the ink and the carrier is obtained, that the ink forms a smooth surface and that it has good wear stability. Magnetically conductive inks which satisfy all these requirements are readily available in the market. Most of the inks presently used for printing magnetically responsive symbols on checks and other documents will serve the purpose. In order to obtain a clean print, that is a print with a minimum of voids or other unintended irregularities in the pattern, the carrier should have a smooth surface. Material such as baryta paper, plastic coated paper, gelatine coated paper, or plastics such as triacetate, polyvinyl, polystyrene and similar plastics are suitable for the purpose.

Figure 6:
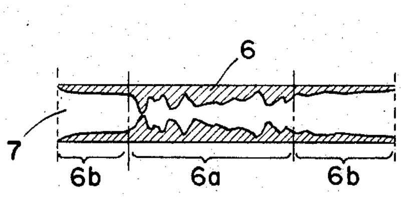
FIG. 6 is a diagrammatic view of an ink printed visible variable area sound pattern according to the invention.

FIG. 6 shows by way of example a bilateral visible variable area sound pattern 6 printed for instance on a sheet of paper 7. Of course, any number of patterns may be printed on the same sheet, and the patterns may be of unequal length. The sheet may also be conventionally and additionally printed with letters, words, music notes, illustrations, and other symbols associated with the sound pattern. The visible sound pattern and the associated material may be printed at the same time, and as a matter of convenience the same magnetically conductive ink may be used for the associated material also.

One of the problems in producing any sound pattern, optical or magnetic, and audibly reproducing therefrom, is to maintain the signal/noice ratio as favorably as possible. In magnetic recording, especially in magnetic patterns visibly printed with magnetic conductive ink in accordance with the invention, the noise is due to voids and other imperfections in the print, more or less unavoidable with printing processes as they are now known. To nullify the effect of such voids and other imperfections as much as possible, the ink-printed pattern according to the invention is so arranged that there is no or only a minimum of magnetizable material at portions of the sound pattern at which no audible signal is to be reproduced.

Referring now to FIG. 6, all the solid black areas in this figure represent magnetizable material such as iron oxide. The central, strongly wavy portion *6a* represents an area from which a burst of modulated sound is to be produced during audible play back. This area is bordered on both sides by narrow parallel strips *6b* which represent areas of silence. Due to the provision of such narrow strips for periods of silence, the areas of the pattern that are potential noise causing areas are reduced to a minimum.

Aural play back of the message from the visible printed sound track is effected basically in the same manner as play back from a conventional variable density sound track magnetically recorded on a magnetizable metal oxide layer and with the same kind of equipment. However, while a conventional magnetic track is sufficiently magnetized during the recording operation for scanning by the play back head, the printed pattern of the invention may not be so magnetized; it is however capable of being magnetized. Magnetizing for aural play back can be effected in the simplest manner by wiping a permanent or electro-magnet along the printed pattern, thereby orienting the elementary magnets in the hardened magnetically conductive ink into a certain direction as more fully explained in connection with FIG. 5. Such magnetization will last for a considerable time and for many aural play backs without appreciable loss of signal strength.

Figure 7:
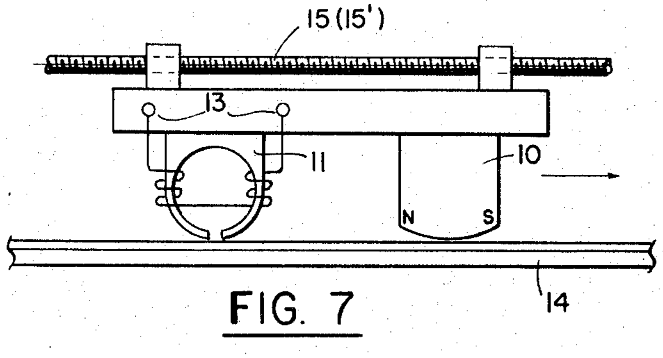
FIG. 7 is a diagrammatic view of a reproducing device for audibly playing back an ink printed visible area pattern according to the invention.

Another efficient method is to provide a magnet directly in front of the scanning head as the same moves in reference to the printed sound pattern. The magnet may be mounted on the same carriage on which the scanning head is riding. FIG. 7 shows diagrammatically a playback device comprising a pre-magnetizing or sensitizing head 10 in the form of a permanent magnet and a scanning head 11 of conventional design, both riding on a carriage 12. Head 11 is connected in the usual manner by means of terminals 13 to an amplifier and a loudspeaker. The carriage may be displaced along the ink printed visible sound pattern 14 by any suitable guide means such as a screw drive 15 in the direction of the arrow, or the carriage may stand still and the sound pattern may be moved so that it first reaches head 10. The heads may be guided on two parallel tracks to obtain high quality and constant contact with the printed sound pattern. Such double track is indicated in FIG. 7 by reference numerals 15, 15'. Premagnetizing head 10 will bring the sound track to full audible signal strength for each play back.

Figures 8, 9:
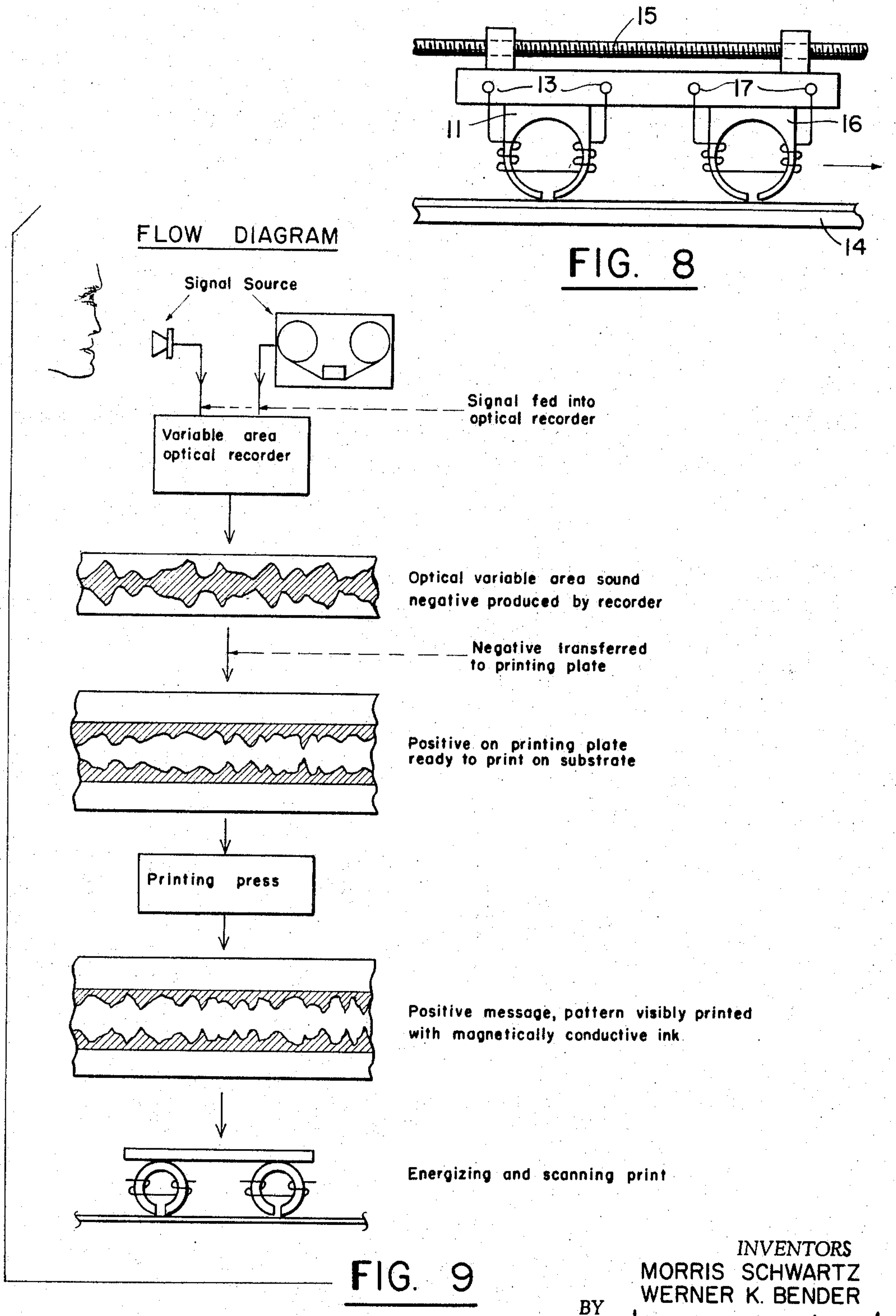
FIG. 8 is a diagrammatic view of a modification of the sound reproducing device.
FIG. 9 is a flow diagram showing the sequence of the steps used in the method according to the invention.

FIG. 8 shows a play-back device in which the permanent magnet 10 of the sensitizing head is replaced by an electro-magnet 16. The electro-magnet is connected by means of terminal 17 either to a source of D-C in which case electro-magnet 16 operates in the manner of a permanent magnet, or to a suitable high frequency generator generating signal frequencies above the audible range, for example 15,000 c./sec.

In the previous description an upper band limit of 5,000 c./sec. has been considered, and it has been shown that a visible magnetic variable area track including such frequencies can be conveniently printed with magnetically conductive ink. It has also been stated that the wave length of such frequency at a scanning speed of 5 inch/sec. is 25 microns. A scanning head with a gap of 6 microns width would be satisfactory to scan a printed pattern up to 5,000 c./sec. Heads having such gaps are readily available in the market. In fact, heads with a gap width of as little as 3 microns are obtainable.

Accordingly, the present state of the art does not limit the printing of visible variable area sound patterns with magnetically conductive ink to an upper frequency limit of 5,000 c./sec. in respect to the printing technique or the play back. In this connection it should be pointed out that all the data stated herein are only given by way of example and that the concept of the invention resides broadly in printing a visible variable area sound pattern with magnetically conductive ink by a printing technique irrespective of the frequency range, and in audibly playing back such printed pattern by scanning the same with the magnetic sound head after first magnetizing the pattern.

The flow diagram of FIG. 9 shows the sequence of steps that are used to produce a variable area visible magnetic message pattern according to the invention. The figure is generally self-explanatory and evident from the previous description. It suffices to state that the steps involved are as follows:

(1) The original sound signals to be audibly reproduced are fed into a suitable and conventional optical recorder from any suitable signal source. There are indicated in FIG. 9 by way of example a microphone and a tape recorder as signal sources.

(2) The optical recorder reproduces the sound signals in the form of a variable area optical pattern on a sensitized layer such as film. The pattern may be predistorted as and for reasons previously described.

(3) After developing the film, the optical variable area sound negative thus obtained is transferred by any one of the several suitable techniques known for the purpose to a printing plate such as a metal plate or stone.

(4) The printing plate which bears a positive of the variable area sound track is now used to print on a substrate a visible variable area message pattern with magnetically conductive ink. Any suitable and conventional printing technique may be used for the purpose.

(5) The visible print on the substrate (which is the positive of the original optical recording) may now be scanned by means of a conventional magnetic reading head, after energizing or presensitizing the sound pattern as previously described.

The visible pattern shown in the flow diagram is a bilateral pattern, as such a pattern has been found to be most convenient for accurately lining up the scanning head, but the concept of the invention applies of course also to other forms of patterns as previously explained.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

We claim:

1. A method of producing a magnetic record of sound, said method comprising the steps of:

(a) generating an electric signal representing a wave pattern of the sound to be recorded;

(b) using said signal to record optically a variable area sound wave pattern on a light sensitive carrier;

(c) subjecting the signal during the optical recording to a distortion in accordance with the frequency pattern of the sound;

(d) transferring the optically recorded distorted wave pattern to a printing plate; and (e) printing from said printing plate a visible variable area sound pattern with magnetically conductive ink on another carrier.

2. The method according to claim 1, wherein said electrical signal is distorted during optical recording by feeding the signal to an amplifier having a non-linear transfer characteristic, and shifting the point of operation of said amplifier in accordance with the frequency pattern of the sound.

3. A method of producing a magnetic record of sound, said method comprising the steps of:

(a) first magnetically recording the sound to be recorded in the form of an invisible sound pattern on a layer of magnetizable metal oxide;

(b) then generating an electric signal representing the magnetically recorded sound pattern;

(c) then using the signal to re-record optically a visible variable area sound wave pattern on a light sensitive carrier;

(d) subjecting the signal during the optical recording to a distortion corresponding to the frequency pattern of the sound;

(e) then transferring the optically recorded distorted sound wave pattern to a printing plate; and (f) finally printing from said printing plate a visible variable area sound wave pattern with magnetically conductive ink on another carrier.

4. A visible variable area sound pattern having outlines representing the amplitudes of the sound pattern formed by a tracing of hardened magnetically conductive ink on a carrier, said pattern being compensated in accordance with creeping of the ink prior to the hardening thereof.

5. A magnetic sound track comprising a carrier, and a tracing of hardened magnetically conductive ink adhered to the carrier, said tracing being in the form of a variable area sound pattern having outlines representing the amplitudes of a sound pattern compensated in accordance with the frequencies of the sounds included in said pattern for creeping of the ink prior to the hardening thereof.

6. An optical sound record comprising a carrier having thereon an optically recorded variable area sound track, the outlines of said track representing the wave pattern of the recorded sound and being compensated in accordance with the frequency pattern of the sound for creeping of the ink prior to the hardening thereof.

7. The method of audibly reproducing a visible variable area sound pattern printed on a carrier with magnetically conductive ink, said method comprising the steps of first pre-magnetizing said pattern with a signal having a frequency above the audible range, and then scanning the pattern with a magnetic scanning head.

8. A device for audibly reproducing a visible variable area sound pattern printed on a carrier with magnetically conductive ink, said device comprising a magnetic scanning head, support means supporting said scanning head, electro-magnetic means for pre-magnetizing said pattern prior to scanning thereof by said scanning head, a source of current connected to said electro-magnetic means for energizing the same with high frequency signals above the audible range, and means for moving said head and said electro-magnetic means in reference to said pattern.

9. A device according to claim 8 wherein said electro-magnetic means is also supported on said support means, and means for moving said support means along said pattern.

10. A device according to claim 9 wherein guide means guide said common support means along a predetermined path, said guide means including a double track to stabilize the scanning head and the electro-magnetic means along said path.

11. A magnetic sound track comprising a carrier, and a visible variable area sound pattern formed by hardened magnetically conductive ink adhered to said carrier, said pattern including an area representing latent sound and a silent area, said latter area being in the form of a straight strip of hardened magnetically conductive ink.

12. A magnetic sound track comprised of variable area sound pattern printed on a carrier with magnetically conductive ink, said pattern being in the form of a variable area dulateral sound pattern and including an area representing latent sound and a silent area, said latter area being in the form of straight border strips of hardened magnetically conductive ink.

References Cited

UNITED STATES PATENTS

| | | | |
|---|---|---|---|
| 2,559,505 | 7/1951 | Hillier | 179—100.2 |
| 2,868,890 | 1/1959 | Camras | 179—100.2 |

BERNARD KONICK, *Primary Examiner.*

A. I. NEUSTADT, *Assistant Examiner.*